United States Patent [19]
Reppert

[11] 4,067,621
[45] Jan. 10, 1978

[54] PLASTIC HUB CAP

[75] Inventor: Merlyn Ralph Reppert, Torrance, Calif.

[73] Assignee: W. R. Grace & Co., New York, N.Y.

[21] Appl. No.: 650,810

[22] Filed: Jan. 20, 1976

[51] Int. Cl.² ............................................. B60B 7/06
[52] U.S. Cl. ........................ 301/108 A; 301/108 SC; 301/37 P; 301/37 SC; 301/37 AT; 285/87–88
[58] Field of Search ............ 301/108 A, 108 R, 108 S, 301/108 SC, 37 R, 37 P, 37 AT, 37 S, 37 SC, 37 CM; 215/218–221, 215; 151/9–12; 403/320

[56] References Cited

U.S. PATENT DOCUMENTS

| | | | |
|---|---|---|---|
| 721,198 | 2/1903 | Kellam | 151/9 |
| 899,346 | 9/1908 | Soper | 301/108 SC |
| 1,039,331 | 9/1912 | Stutzman | 301/108 SC |
| 1,070,125 | 8/1913 | Faith | 151/11 |
| 1,325,468 | 12/1919 | Foster | 285/88 |
| 1,382,577 | 6/1921 | Vauclain | 301/108 SC |
| 2,044,667 | 6/1936 | Collins | 151/12 |
| 2,331,489 | 10/1943 | Matsumoto | 151/9 |
| 3,172,704 | 3/1965 | Wise | 301/37 CM |
| 3,399,796 | 9/1968 | Steiner | 215/221 X |
| 3,731,978 | 5/1973 | Davis | 301/108 SC |
| 3,884,379 | 5/1975 | Landen | 215/221 |

FOREIGN PATENT DOCUMENTS

| | | | |
|---|---|---|---|
| 640,092 | 3/1928 | France | 301/37 SC |
| 734,802 | 4/1943 | Germany | 151/9 |
| 421,260 | 3/1947 | Italy | 301/37 SC |

*Primary Examiner*—Robert B. Reeves
*Assistant Examiner*—Charles A. Marmor
*Attorney, Agent, or Firm*—William Kovensky; William W. McDowell, Jr.

[57] ABSTRACT

An inexpensive relatively theft-proof hub cap for the center of a vehicle wheel made up of inner and outer caps joined together by a screw thread connection and locking means. Each cup is plastic and molded in one piece. One of various locking arrangements integral with the two cups, with no additionally loose pieces, holds the structure securely on opposite sides of a wheel, while permitting the cups to be readily assembled or disassembled by hand without tools.

24 Claims, 16 Drawing Figures

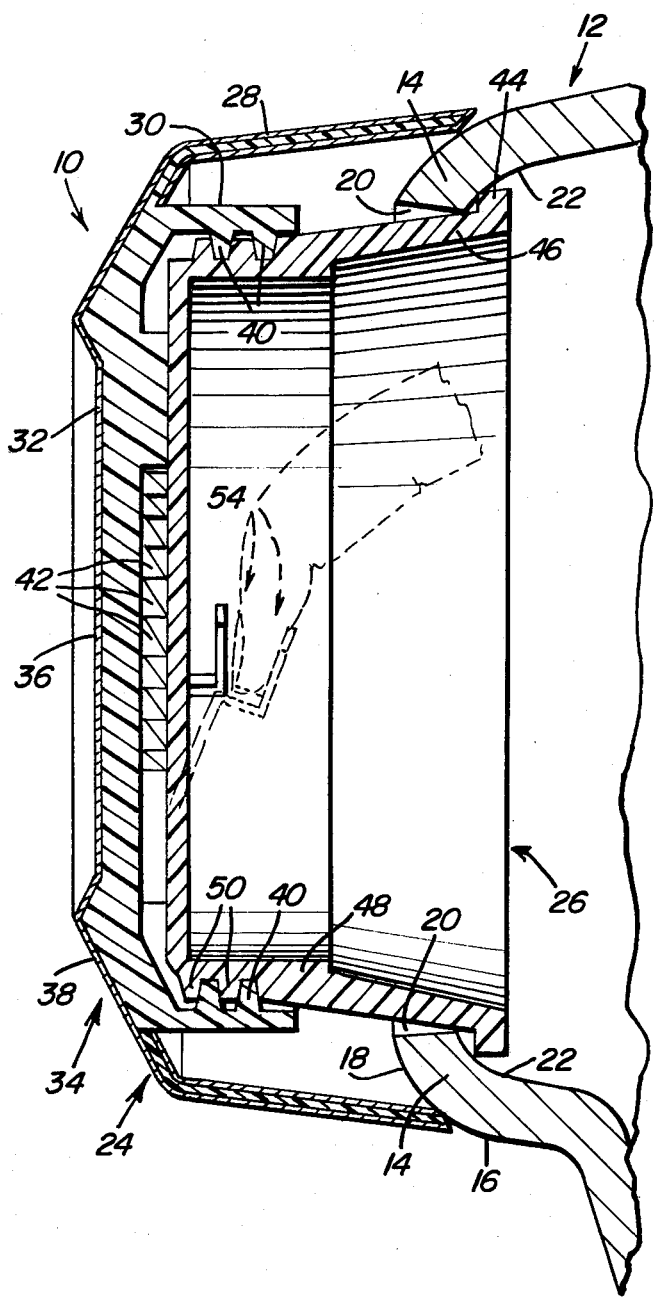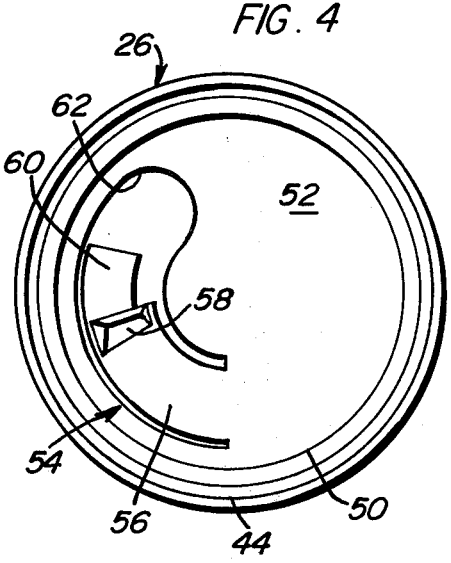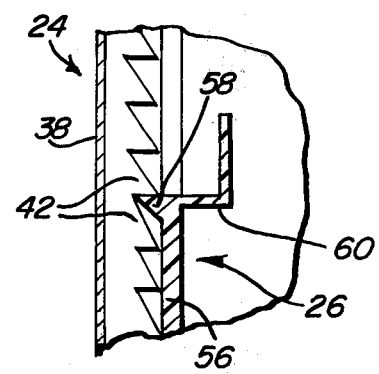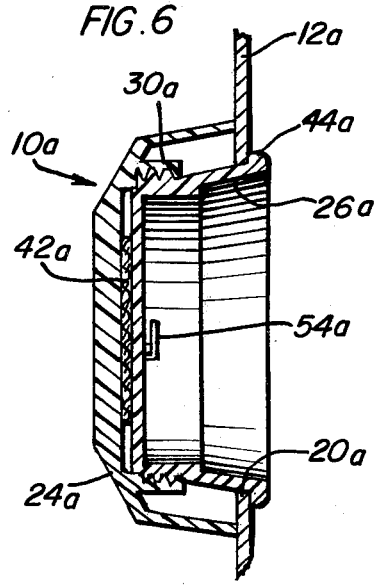

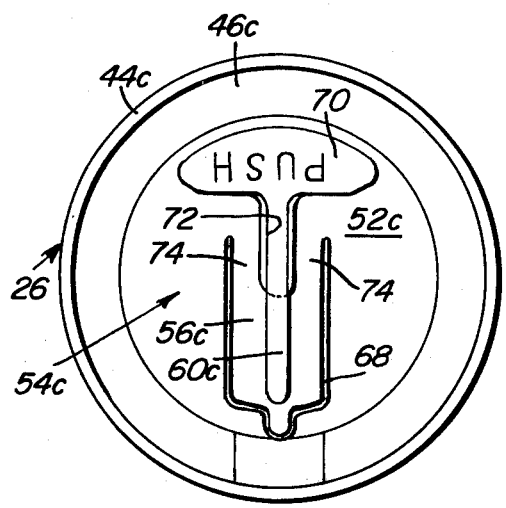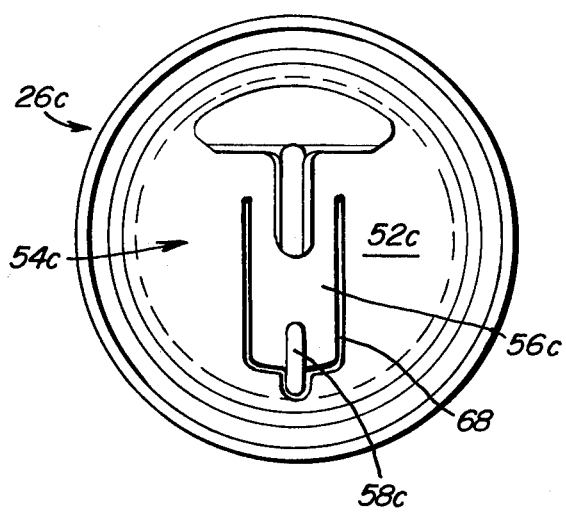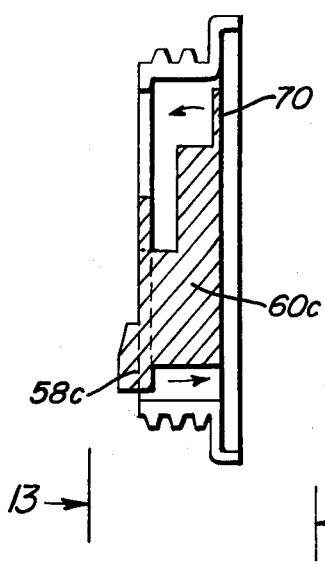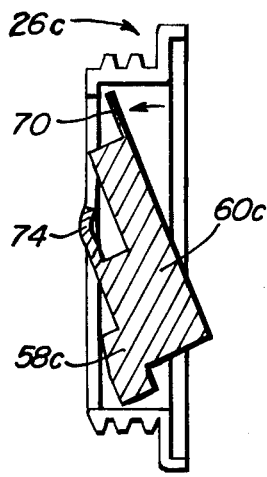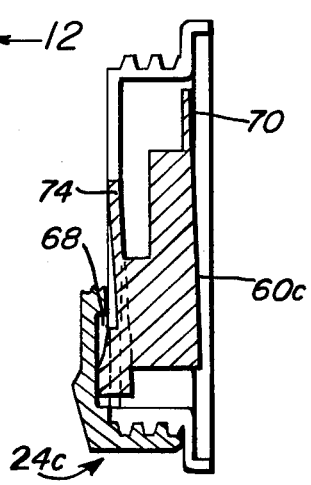

PLASTIC HUB CAP

This invention pertains to vehicle wheels, and more particularly it pertains to improved hub caps or center devices for such wheels.

The present invention can be used with many different kinds of wheels. As an example, reference may be had to my U.S. Pat. No. 3,874,054, (assigned to the same assigned as the present invention) with particular reference to FIGS. 7a and 8b thereof, which shows a wheel with which the invention has been used.

In the business of decorative wheels, the provision of a center, or hub cap, has been a particular problem. A fair amount of expense is required in providing such hub caps. The cap for the hub of such decorative wheels are formed separately from the wheel itself. A name, company escutcheon, or logo is often provided on the cap, which is made separate and removable from the wheel to allow access to the wheel center hole which is used when changing tires. Many different methods and types of apparatus are utilized in the prior art for fixing such decorative centers or hub caps to such decorative wheels. Sometimes a metal plate is provided on the back side of the wheel which is joined by screws, locating pins, and the like, in tapped holes and guide holes in the wheel center. Other prior methods include the use of springs, many sorts of clips, slots, cams, and many others. A problem which must be overcome is to provide a hub cap which is light weight, theft-proof, resistant to being loosened by road shock and vibration, inexpensive, good looking, and yet easy and reliable in use in being mounted and dismounted from the wheel or other carrier. The various forms of the invention solves all of these problems, and provides generally improved hub caps over the prior art.

These prior methods suffer from many disadvantages which are overcome by the present invention. Among these disadvantages is the fact that metal parts are often used. The use of metal in the decorative center increases the weight and the cost of the wheel compared to the plastic used in the present invention. Conjunctive with the use of metal is the use of metal fabricating techniques, including the drilling of holes, polishing, and the like, which are considerably more expensive than plastic finishing techniques. Manufacturing processes used in stamping and in die casting metals often generate problems for the designer which are not present or at least not as severe in die casting plastic.

The present invention overcomes all of these disadvantages in its provision of a simple two-piece structure, both made of plastic. The invention leads itself to highly efficient, low-cost and reliable methods of manufacture, particularly die-casting of plastic. Plastic molding is highly desirable for the additional reason of its great versatility, i.e., the parts can be so configured that they are flexible where needed and yet strong and rigid in other portions as required. The external surfaces of the decorative wheel center can be made to virtually identically simulate metal with the use of high quality metal plating techniques.

In operation, the invention comprises an inner cup and an outer cup which are fitted on opposite sides of the hub of the wheel. The external cup is formed with threads which cooperate with mating threads on the internal cup. Various types and kinds and combinations thereof of locking means are also provided.

In one embodiment, the external cup is formed with an annulus of radially disposed ratchet teeth which face towards the inner cup. The inner cup is formed with an integral pawl member formed at the end of an integral lever portion formed in the end face of the inner cup. As the two cups are threaded together on opposite sides of the wheel hub, the ratchet device formed between the teeth on the outer cup and the pawl on the inner cup first come into contact and then are locked together, preventing disassembly of the decorative device from the wheel center unless the pawl is affirmatively disengaged by the user to accomplish such disassembly. To that end, a finger member is molded into the inner cup in cooperation with the pawl to facilitate such disassembly.

In a second embodiment the locking means comprises an annulus of radially disposed teeth defining a ring of square cross-section slots which face toward the inner cup. The inner cup end face has an integral pivoted finger analogous to the integral pawl of the first embodiment. This integral finger is operated by a pushing action, as opposed to the pulling action required with the pawl. The pulling action of the first embodiment may be deemed more or less advantageous than the pulling action required of the push finger in the second embodiment, dependent upon the surrounding environment. The second embodiment also has the operational feature that a positive lock, as opposed to the ratchet of the first embodiment is provided. That is, once the square finger falls into a square notch, the parts will not screw together or apart. In the case of a ratchet, the parts can be tightened further, i.e., they are permitted to move in one direction by a pawl and ratchet teeth arrangement.

Additionally, the invention contemplates complete interchangeability, that is, for example, the ratchet pawl of the first embodiment could be used with the push feature of the second embodiment. Most generally, the push arrangement can be used with either the locking finger or the ratchet pawl, or the pull arrangement can be used with either of the two locking means. Each feature, and each combination of features, will be chosen dependent upon the particular use. For this reason, no feature or combination can be called a preferred embodiment standing by itself.

Thus, the invention provides the advantages of low cost of manufacture, high reliability in use, a relatively theft-proof center, light weight, appearance equal to the prior metal parts, and much improved ease in assembling and disassembling the two piece decorative center from the wheel without the use of tools and with no loose parts to lose, break or misplace.

The above and other advantages of the invention will be pointed out or will become evident in the following detailed description and claims, and in the accompanying drawing also forming a part of the disclosure, in which:

FIG. 2 is a cross-sectional view taken on line 2—2 of FIG. 1;

FIG. 4 is a front elevational view of the inner cup showing the pawl;

FIG. 5 is an enlarged partially cross-sectional view showing the engagement of the pawl connection;

FIG. 6 is a view similar to FIG. 2 showing a modified form of the invention;

Figure 1:
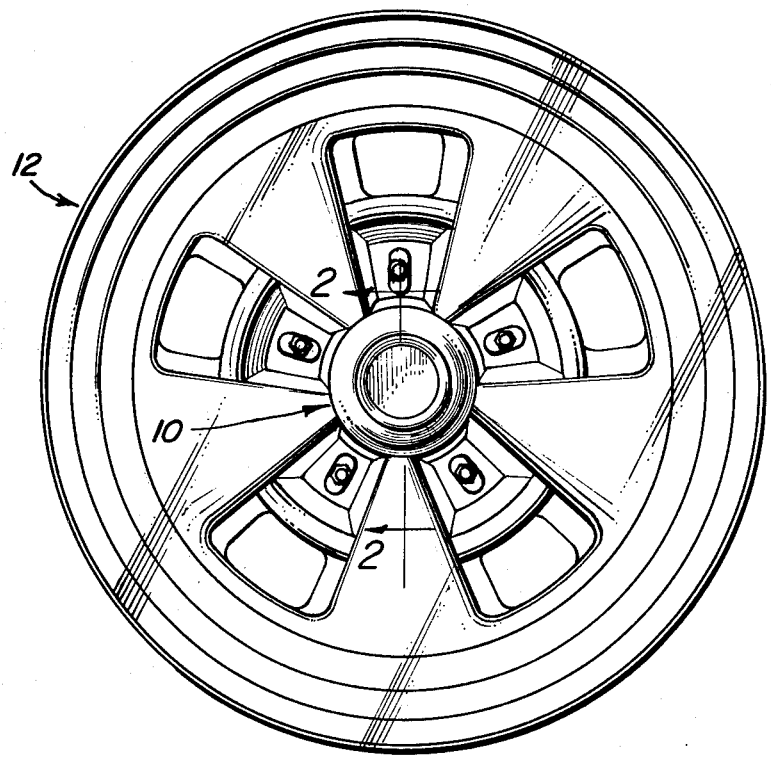
FIG. 1 is a front elevational view of an automobile wheel including the invention decorative center mounted thereon.
Figure 8:
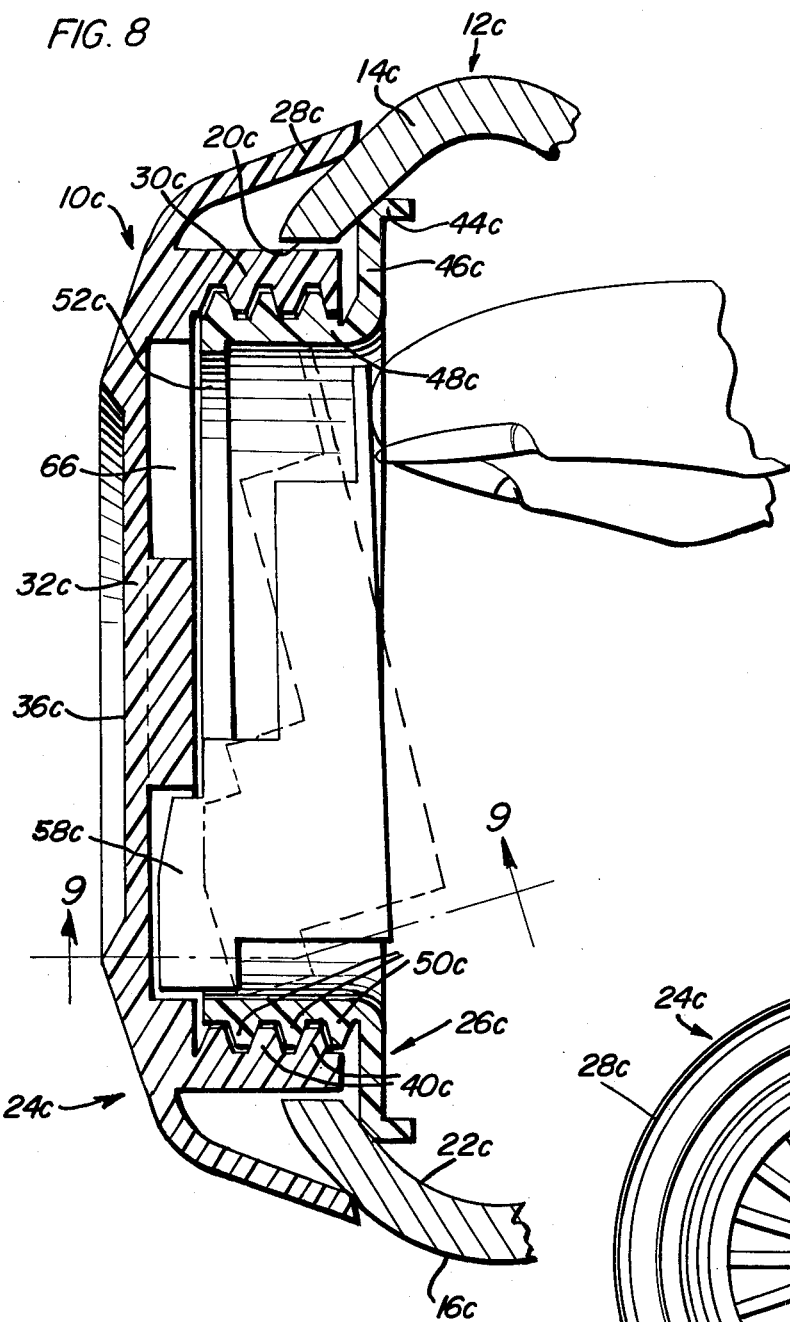
FIG. 8 is a cross-sectional view similar to FIG. 2 showing a second embodiment of the locking means.

FIGS. 12 and 13 are rear and front elevational views of the inner cup along lines 12—12 and 13—13 of FIG. 14, respectively; and FIGS. 14, 15, and 16 are similar cross-sectional somewhat diagrammatic views of the inner cup of FIG. 8 illustrating the mode of operation of the locking finger thereof. Referring now in detail to the drawings; in FIG. 1 reference numeral 10 indicates a first embodiment of the two-part wheel center of the invention shown mounted on a wheel 12. This wheel 12 is the same wheel shown in greater detail in my above-identified U.S. Pat. No. 3,874,054. Of course, the invention is adoptable for use with virtually any wheel, or in other environments, as set forth herein.

So far as it is pertinent to the present invention, wheel 12 comprises a hub portion 14 having a central opening through which the invention device 10 is mounted, see FIG. 2. The hub portion 14 comprises an inturned lip at its inner end which defines the central through opening. Outwardly of this inturned circular lip, the metal of the center of the wheel 12 is formed into the various spokes, wells, and the like, which are part of that specific wheel, but which do not form a material part of the present invention. The hub 14 is formed with a surface 16 which has a predetermined angle with respect to the center line of the wheel. Inwardly of this surface, the hub 14 is formed with a second curved surface 18, which blends smoothly into the surface 16, and which terminates finally at the central opening 20 in the hub in the wheel. Another surface 22, which is similar to the surfaces 18 and 16 on the outside of the hub, defines the inside of the hub portion 14. This surface 22 extends between the central opening 20 and the decorative portions of the wheel inward of the hub portion 14.

Figure 3:
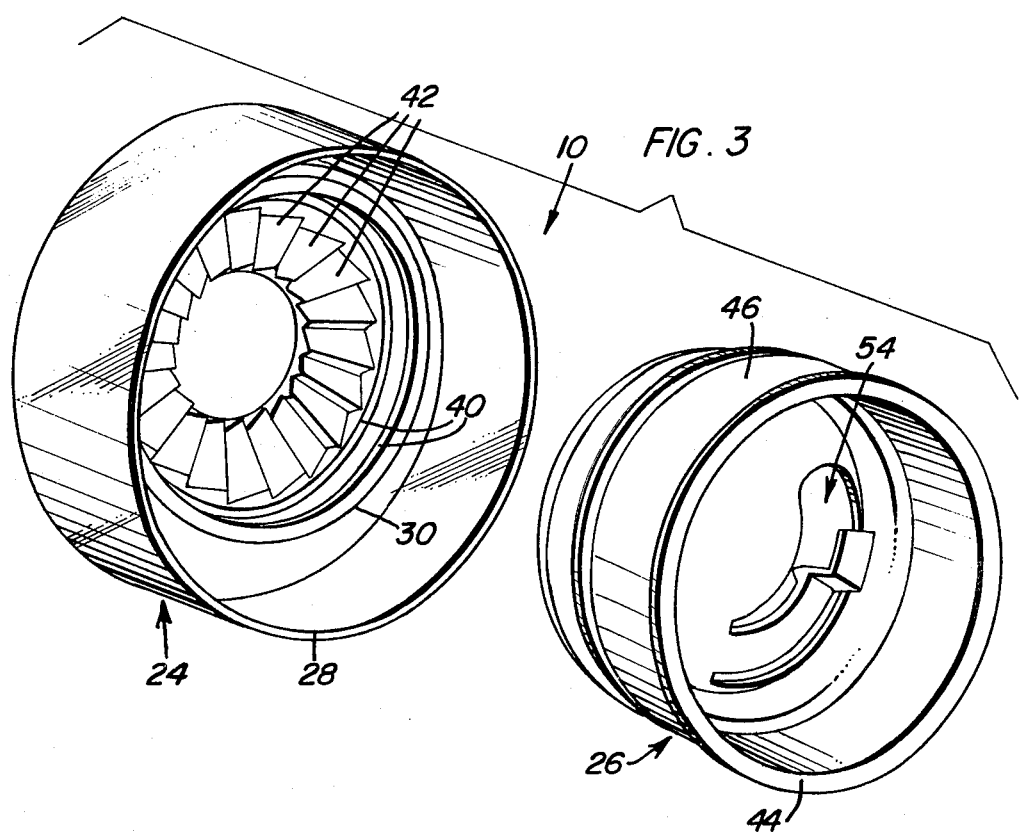
FIG. 3 is an exploded perspective view of the wheel center of the invention.

This embodiment comprises an outer cup member 24 which cooperates with an inner cup 26. Referring now simultaneously to FIGS. 2 and 3, outer cup member 24 comprises an outer skirt portion 28 and an inner skirt portion 30. The two skirt portions 28 and 30 are joined together at their inside ends by an inner portion 32 which has an outer tapered face 34, and a depressed center 36. These portions 34 and 36 serve primarily as decorative features. In practice, the escutcheon of the assignee is cast or molded into this surface 36. As is obvious, and as is set forth below the external appearance can take many configurations as required or desired. Skirt portion 28 is preferably tapered to match the taper of the surface 16 of the wheel hub portion 14. In this manner, when the outer cup 24 is mounted on hub 14, a generally smooth continuous surface, marked only by a line at the end of the cup portion 28, is presented to a viewer, whereby the impression is created that the hub 10 is integral with the wheel. To further enhance this effect, the outside surface and part of the inside surface is required by the plating operation, is plated as indicated at 38. The wheel 12 is chromium plated, and the outside surface of the outer cup 24 is similarly chrome plated, whereby the cup appears to be a continuous extension of the wheel in the assembled condition. Of course, the plating could be omitted in other environments.

The inner skirt 30 is of substantially shorter axial length than the outer cup 28, and it is formed with internal screw threads 40. Inwardly of the threads 40 the inside of the outer cup 24 is formed with teeth means in the form of a set of ratchet teeth 42. The teeth 42 are integrally molded into cup 24, extend rearwardly out from the bottom surface of the center portion 32 of the cup 24 and are concentrically located inside of the inner and outer skirts 28 and 30. Teeth 42 are disposed radially in an annular ring.

The entire outer cup 24 is integrally cast in plastic in a single piece. Many different materials can be used, in the successfully constructed embodiment, a grade of ABS plastic suitable to accept the metal (chromium) plating was successfully used. Additionally, the outer cup should be more rugged and more rigid than the inner cup which is formed of more flexible plastic to permit fabrication of the integral moving parts, as set forth below. A plastic called "Delrin" a DuPont trademark for its malamine plastic, which does not take plating very well but which is flexible, was successfully used.

The inner cup 26 comprises a bead portion 44 formed at the end of a flange portion 46. The bead portion 44 extends radially outwardly, and the flange 46 tapers slightly radially outwardly towards bead 44 from its start at the inner cup portion 48 which is formed with external screw threads 50 which mate with the external screw threads 40 formed in the inner skirt portion of the outer cup member. At the inside of the cup portion 48, member 26 is formed with an end wall 52 which is integrally formed with a flexible arcuate locking portion 54, see FIGS. 3, 4 and 5. Flexible locking portion 54 comprises an arcuate portion 56 integrally formed in end wall 52. At its free end lever portion 56 carries a pawl detent 58 on the side thereof facing towards the ratchet teeth 42. Opposite the pawl detent 58, portion 54 comprises a lifting or operating finger member 60. The end wall 52 is molded with an arcuate shaped opening 62 which includes the slots to define the lever portion 56, and which is also formed with an enlarged clearance portion in the vicinity of the finger 60 to facilitate a user inserting his finger under the operating portion 60 in order to lift the pawl detent 58 away from the ratchet teeth 42. This lifted away condition is shown in phantom lines in FIG. 2. Only when the pawl detent 58 is thus lifted off of teeth 42 can the cups 24 and 26 be screwed apart and removed from wheel 12.

It is significant to note that the entire flexible portion 54 is molded integrally in the wall 52 of the inner cup. Thus, the entire inner cup member 26 may be integrally molded in one piece, including the "spring loaded" locking portions.

While the threads 40 and 50 shown are the preferred "attachment means" between the inner and outer cups, it will be understood by those skilled in the art that other attachment means, such as bayonet type fittings, or pins and ramps, or the like, could be used in their place. Similarly, the term "lock means" covers the pawl and ratchet of this embodiment, the lug and slots of the 10c embodiment, plus all equivalents thereof falling with the proper scope of the claims.

The invention is not limited to use with a wheel having a hub with an inturned lip such as shown in FIGS. 1 to 5. For example, a different shaped hub is shown in FIG. 8, and in other environments it might be desired to provide a row or ring of decorative items in a circle in corresponding holes in a flat wall. Referring to FIG. 6 (wherein the same reference numerals used above, followed by "a" are applied to similar or the same parts) there is shown such a wall 12a which corresponds to the wheel 12 of FIG. 1. This wall is formed with an opening 20a, and the device 10a is mounted therein by means of inner and outer cups 26a and 24a. All of the preceding description is equally applicable to this second embodiment 10a, the only differences being that the dimensions of the parts are reconfigured to fit in an opening in a flat surface, as opposed to a hub having an inturned lip.

Figure 7:
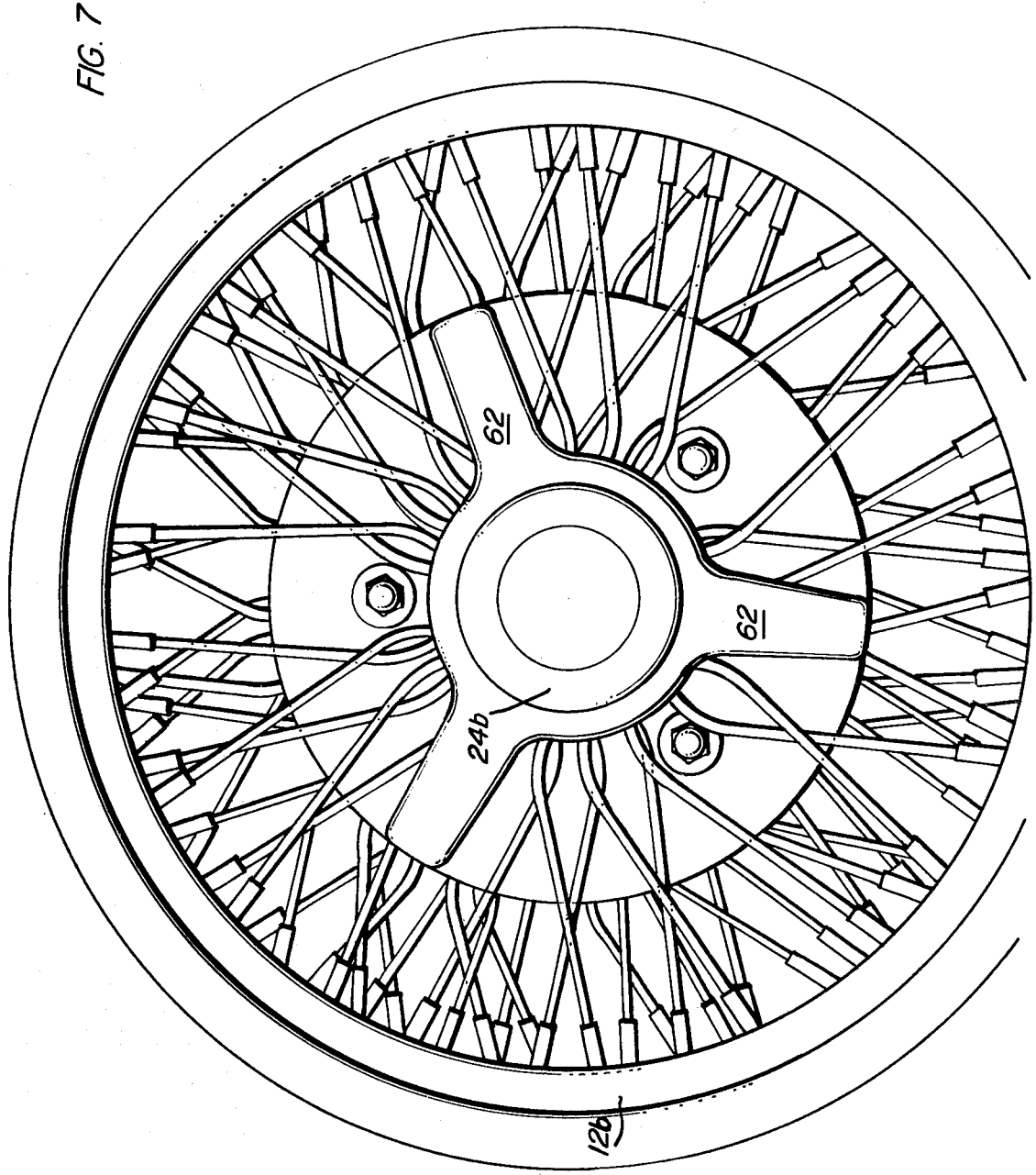
FIG. 7 is a view similar to FIG. 1 showing another modified form of the invention.

Referring now to FIG. 7, there is shown a modified form of the invention on a wire wheel 24b. This hub cap 12b serves an additional decorative function in the embodiment of FIG. 7. The outer cup 24b is integrally molded with radially extending extensions 62. This achieves the popular so-called "spinner" or "knock-off" hub cap which is generally popular and especially so on wire wheels. All of the other parts and the functioning of the invention are the same as those shown and described above; i.e., only the outer cup is specially formed. Of course, in this embodiment, and with respect to the invention generally, dimensions and/or minor adjustments in configuration will probably be meeded to fit the invention hub cap to a particular wheel. Thus it can be seen how the outer cup of the invention can be used to serve an additional decorative function. Similar modifications can be made to the inner cup in an appropriate environment, and the feature can also be used with either the FIG. 2 or FIG. 8 locking means, or combinations thereof.

In FIGS. 8 through 16, there is shown another embodiment 10c of the invention. Parts the same as or closely analogous to parts described above are indicated by the same reference numerals followed by "c".

The 10c device is axially shorter than the embodiment 10 of FIG. 2. Further, this embodiment is shown mounted on a hub portion 12c having a configuration slightly different from the hub 12 of FIG. 2. Thus, the great versatility of the invention hub cap device is well illustrated. The major feature of this second embodiment 10c is the push-type release mechanism, described in greater detail below.

The pull type release described above operating with a pawl and ratchet teeth has the advantage that it locks together automatically as the cups are screwed together. However, a ratchet does have the disadvantage that over-tightening is possible. That is, the parts can be forced together an excessive amount in the direction permitted by the ratchet teeth. Further, the first embodiment 10 discloses a pull finger to disengage the pawl from the ratchet to permit disassembly of the parts. In certain environments, it may be difficult for the user to pull on the finger, and it may be easier to provide a push type mechanism. That is, it may be easier for the operator to push on a device for disassembly than to pull on the finger for disassembly. Such alternative structure is shown in FIG. 8 in conjunction with a set of positive locking teeth and lug, as opposed to the one-way ratchet teeth and pawl of the first embodiment. The two features are completely interchangeable. That is, the pull type release can be used with either the ratchet teeth of the first embodiment or the locking slots of the second embodiment, and the push type locking mechanism can be used with either type of lock. Inerchangeability can be simply done by a change in the pawl and/or lug of the respective release mechanism for cooperation with the respective ratchet teeth or locking slots. Of course, suitable adjustments of the dimensions of the various parts to accomodate for the change in locking means, and for the specific wheel hub or other carrier with which such a modified embodiment is used, may be needed.

Figure 10:
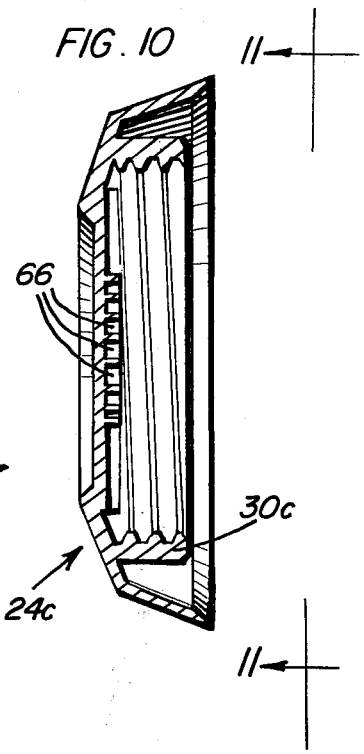
FIG. 10 is a cross-sectional view of the outer cup shown in FIG. 8.
Figure 11:
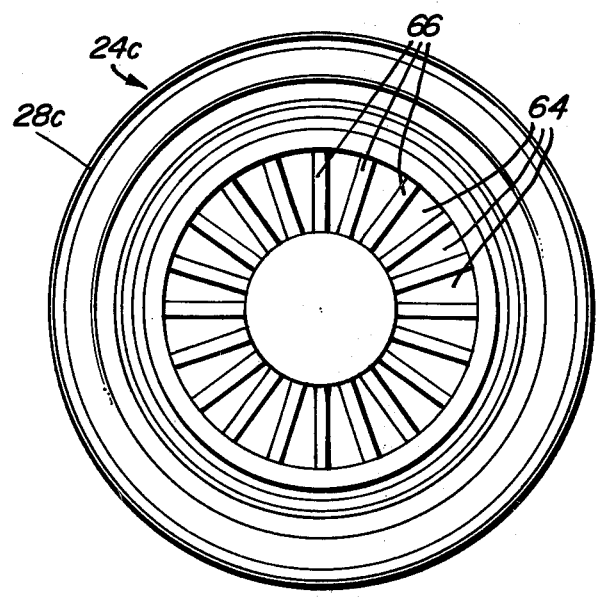
FIG. 11 is a rear view of the outer cup along line 11—11 of FIG. 10.
Figure 9:
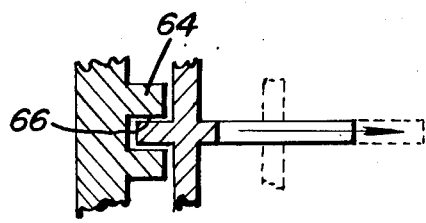
FIG. 9 is a cross-sectional view of a detail taken on line 9—9 of FIG. 8.

Referring now in detail to FIGS. 8 through 13, the teeth means comprise an annular ring of locking teeth 64 formed in the bottom of the outer cup 24c, analogous to the ratchet teeth 42 of the FIG. 2 embodiment. These teeth means are best shown in FIGS. 9, 10 and 11, The teeth 64 themselves are trapezoidal in plan view, see FIG. 11, but the slots 66 therebetween are square or rectangular in cross-section, and uniform over their length radially of the cup member 24c. Except for the change in the teeth, and, or course, the dimensions of the parts, the outer cup of the second embodiment may be the same as the outer cup of the first embodiment. The plating 38 has been omitted in these latter Figures to simplify the drawings.

Referring now to FIGS. 8, 12 and 13, the inner cup 26c comprises a bead portion 44c and a flange portion 46c which are shaped somewhat differently than the analogous parts 44 and 46 of FIG. 2 for the purpose of accomodating the somewhat differently shaped wheel hub 12c, and for the purpose of achieving a hub cap device 10c of an overall shorter axial length. The end wall 52c is formed with a flexible portion 54c, in the form of an integral lever portion 56c. Lever portion 56c is in the plane of the end wall 52c, and is defined by a generally U-shaped through slot 68 formed in wall 52c. At its free end, lever portion 56c carries a locking detent means, specifically a locking lug 58c, see FIGS. 8 and 13, on the side thereof facing towards the locking slots 66. On the other side of wall 52c, lever portion 56c carries a push member or operating member 60c. At its free end, opposite the locking lug 58c, operating member 60c is formed with a push bar portion 70. Wall 52c is formed with a clearance opening 72 adjacent the push bar end of the operating member 60c. This opening 72 extends between the free ends of the U-shaped slot 68, to thereby define a pair of hinge zones or portions 74 therebetween, as is best shown in FIG. 12. These hinge zones 74 will be described in greater detail below in regard to FIGS. 14 through 16. The unlocked position of the parts is shown in phantom lines in FIG. 8, and in FIG. 15.

Just as with cup 26 of the first embodiment, cup 26c is also molded integrally entirely in one piece, including the flexible portions, the push bar 70, and the two clearance slots 72 and 68 which together produce the hinge portions 74.

As shown in FIGS. 8 through 16, the embodiment 10c, as to the locking means, is shown as a push operated release mechanism. However, this same pivoted lever could be made into a pull or lift type of device by adding a lifting finger, like part 60 shown of FIG. 5, to the other end of the hingedly mounted locking member 60c, at the same end thereof carrying the lug 58c, and, of course, on the opposite side from the lug 58e.

In the embodiments of the invention shown, all of the parts were round. This is, of course, common and ordinary in vehicle wheels, which is the environment out of which the invention grew. However, as can be readily appreciated, the invention could as well be used in other configurations. For example, a square opening could be provided, and the parts could be modified for use therein. For example, an outer cup of square external shape with a circular threaded cup molded on its inside. In such case, other attachment means might be needed, or the front end of the inner cup might be made round while the back end was of such other configuration. Perhaps only the bead might need to be different to fit a round cup in a non-round hole. Similarly, the outside cup could have many different configurations. The necessary change might be simply changing the outside of the outer cup while having its inner skirt and the inner cup substantially as shown. In any case, the possible uses of the invention in non-round openings should now be evident.

Thus, in its most general sense, the invention comprises a means for connection to a through opening. That is, for example, the outside of the outer cup could be modified in many ways, wuch as into a handle to carry the device 12. The inner cup is similarly versatile, and could be used as a resevoir for liquids, for example. Various other utilizations for the inner and/or the outer cups will present themselves to skilled artisans. The essential parts of the invention are the use of attachment means, such as the screw threads 40 and 50; plus some locking means, such as the pull finger of embodiment 10, or the push mechanism of embodiment 10c; in further combination with inner and outer cups that grasp opposite sides of the member to which the invention device is being connected. In these variations, the locking means could be reversed, i.e., teeth on the inner cup, and finger and pawl or push lever on the outer cup, especially where the outer cup is unimportant as to appearance and/or function. The bead 44 could be made into a side flange to accomodate many different sizes of through openings. In such cases, other means would have to be provided to accomplish a centering function, if it were important for the device to be centered in the through opening.

Useful function may be provided on either side, see particularly FIG. 6. That is, the left side including the outer cup might perform the useful function where the end result is decoration, or the mounting of the outer cup or something fixed to it, such as spinner 62 of FIG. 7, on the outside of the opening. Alternatively, the inside cup could serve the useful function if it were desired to provide a recess or a cavity. Useful functions could be performed on both sides simultaneously; and many other variations will present themselves to users and skilled artisans.

Another alternative possible within the invention is the provision of a mounting opening of reduced diameter with respect to the opening in which the invention is mounted. That is, looking at FIG. 3, for example, the space inside of the annular row of radially disposed teeth 42 could be an opening. In such case, a corresponding opening being formed in the end wall 52 of the inner cup, a grammet or washerlike means would be provided by the invention. This grommeting function could be in conjunction with or in addition to a decorative and/or utilitarian function performed by one or both of the inner and outer cups.

Since the invention can be used on a wheel hub, a flat wall, or any of many other devices provided with a through opening corresponding to the opening 20 or 20a, the term "carrier", as used in the specification and claims herein, shall be understood to mean any such device having such an opening with which the invention may be utilized. Similarly, the terms "inner", "outer", and "cup" should not be considered solely in their limited dictionary definitions. "Inner" and "outer" can and do refer to both the invention connection members being nested; "cup" refers to the parts as shown and where the members are not "cups", (i.e., have some other configuration which might not be "cuplike"); or in other environments "inner" and "outer" could refer to merely the opposite sides of the "carrier", as a convenience.

OPERATION

The following refers directly to the first embodiment, but, of course, certain techniques, steps, etc., are equally applicable to the push type locking means of FIG. 8 et. seq. as well. To assemble the FIG. 2 embodiment, the user first removes the wheel from the vehicle. Then he inserts the inner cup through the opening 20 in the hub portion 14, holding it with his hand, and screws the outer and inner cup members together via threads 40 and 50. At the end of this operation, the last quarter or half turn or so, the parts are so dimensioned that the ratchet will engage and will continue to engage until the parts are firmly locked together on opposite sides of the hub. The bead 44 will be in contact with the inside surface 22 of the wheel hub, and the end face of the outer skirt 28 of of the outer cup will be firmly against the surface 18 near its juncture with the surface 16 of the hub 14. Thus, a continuous appearance is presented, because of the similar angles, from surface 16 out onto the outside of the skirt 28. Irregularities in wheel hubs are readily accomodated due to the flexibility of the pawl portion, specifically the lever part 57. That is, the ratchet will accomodate a large range of dimensional differences in the parts, flexing more or less out of its normal position in the plane of the end plate portion 52. That is, in any particular wheel and invention device combination, the final position of the pawl lever 56 could be anywhere between the positions indicated by the dotted and phantom lines in FIG. 2, so long as there is sufficient additional play to permit release.

If it should be desired to disassemble the parts, (sometimes it may never be desired), the user merely lifts the pawl away by putting his finger under the operating finger 60, urging it towards the dotted line position shown in FIG. 2. Thereafter, he may simply screw the outer and inner cups apart. Accidental disengagement, and attempted theft of the decorative cup, however, is very securely prevented in that the pawl 58 engages against the ratchet teeth 42, thereby assuring that the parts 26 and 24 will not rotate with respect to each other unless and until the pawl and ratchet assembly is disengaged. Thus this form, as well as the FIG. 8 form, and combinations of both forms, of the locking means of the invention provide a very secure hub cap which is theft resistant and which will not come loose or fall off despite the enormous amount of shock and vibration to which it is subjected in normal use on a vehicle wheel, and yet which is easy to remove from the carrier once access can be had to the pawl or locking tab.

The operation of the FIG. 6 modified form will be clear from the above. The FIG. 7 feature is decorative rather than functional.

Referring now to FIGS. 14, 15 and 16, the operation of the 10c embodiment is shown. The showing of the outer cup 24c in FIG. 16 is partial only for the sake of clarity. It can be seen that the hinge portions 74 act as theoretical torsion points in the locking and unlocking action. Comparing FIGS. 14 and 15, when the operator applies pressure in the direction of the arrow on the push bar 70, the hinge portions 74 move toward the locking slots and simultaneously bend or flex to allow the lug 58c to pivot out of its slot 66. The parts must also be in this FIG. 15 position in order to assemble the two cups 24c and 26c together, in that in this embodiment there is no ratcheting action, the lug 58c simply locking into a selected slot 66, the two parts 58c and 66 being of generally rectilinear cross section.

FIG. 16 illustrates another advantage of the invention, the fact that the operating member 60c is somewhat tensioned about the hinge portions 74 when the parts are fully assembled, thereby preventing any looseness in the assembled condition of the parts. Another advantage of this locking structure with respect to the ratcheting arrangement of the first embodiment is that this second embodiment 10c permits a limited amount of movement of the two cups 24c and 26c together when they are in assembled relation. This is an advantage, especially when the spinner device 62 of FIG. 7 is used, in that the parts can be moved so as to facilitate access to the lug bolts in removing the wheel from the vehicle. With the ratcheting arrangement, there is a possibility of over-tightening and subsequent damage to the hub cap part by grasping and turning the spinner extensions. In the 10c FIG. 8 embodiment the two cups will move together to permit this small amount of adjustment and motion, to facilitate wheel dismounting.

While the invention has been described in detail above, it is to be understood that this detailed description is by way of example only, and the protection granted is to be limited only within the spirit of the invention and the scope of the following claims.

What is claimed is:

1. A hub cap device for attachment to a wheel formed with a central hub having an inturned lip defining a through opening, the combination comprising an inner cup having a portion sized to fit through said wheel hub and said central through opening, means on said inner cup cooperable with the inside of said inturned lip to prevent passage of said inner cup completely through said through opening, an outer cup having a portion cooperable with the outside of said wheel hub and to prevent said outer cup from passing through said through opening, attachment means between said inner and outer cups securing said inner and outer cups together when assembled, and lock means to prevent inadvertant disassembly of said cups, said lock means comprising an integral flexible lever having detent means at one end on one of said cups and an annular ring of radially disposed ratchet teeth on the other of said cups and cooperable with said detent means.

2. The combination of claim 1, said outer and inner cups each comprising an end wall, said ratchet teeth being formed on the inside of said outer cup end wall, and said flexible lever being formed in said inner cup end wall whereby said lock means may be moved away from said teeth means via said integral flexible lever to unlock said lock means and to permit the disengagement of said attachment means between said inner and outer cups.

3. The combination of claim 1, said integral flexible lever comprising an arcuate lever, and said detent means comprising a pawl detent formed on the free end of said lever portion overlying said ratchet teeth in the assembled together condition of said inner and outer cups.

4. The combination of claim 1, and lifting means at said one end to permit disengagement of said detent means away from said rachet teeth.

5. The combination of claim 1, said attachment means between said cups comprising mating threads formed as male threads on said inner cup and female threads on a depending flange formed on said outer cup concentrically inwardly of said cooperable portion of said outer cup.

6. The combination of claim 1, wherein said cups and said through opening are all round in configuration, and said inner cup preventing means is a bead portion of a larger diameter than the diameter of said through opening.

7. The combination of claim 1, said attachment means of said cups comprising mating screw threads formed on said inner and outer cups for connecting and disconnecting said cups to each other.

8. The combination of claim 1, wherein said wheel is a vehicle wheel and said outer cup is decorative cap for the hub of said wheel.

9. The combination of claim 8, wherein said preventing means of said outer cup comprises an outer skirt portion inclined at an angle to match said wheel hub, whereby a continuous finished surface appearance is created between said outer cup and said hub.

10. The combination of claim 1, wherein said inner and outer cups are each formed in one piece entirely of plastic.

11. A hub cap device for attachment to a wheel formed with a central hub having an inturned lip defining a through opening, the combination comprising an inner cup having a portion sized to fit through said wheel hub and said central through opening, means on said inner cup cooperable with the inside of said inturned lip to prevent passage of said inner cup completely through said through opening, an outer cup having a portion cooperable with the outside of said wheel hub and to prevent said outer cup from passing through said through opening, attachment means between said inner and outer cups securing said inner and outer cups together when assembled, and lock means to prevent inadvertent disassembly of said cups, said lock means comprising an integral flexible lever having a lug at one end on one of said cups and an annular ring of radially disposed teeth on the other of said cups and cooperable with said lug.

12. The combination of claim 11, said teeth being of trapezoidal shape to define said annular ring of radially disposed locking slots, said integral flexible lever comprising a hinged lever portion, and said lug being formed on one end of said lever portion to overlie said slots and teeth in the assembled together condition of said inner and outer cups.

13. The combination of claim 11, said lever portion being hingedly mounted intermediate its ends, said lug overlying said teeth in the assembled together condition of said inner and outer cups, and means to pivot said lever about said hinge portions to permit disengagement of said lug away from said teeth.

14. The combination of claim 13, said means to pivot comprising a push bar portion of said lever at the end thereof opposite said lug.

15. The combination of claim 11, wherein said cups and said through opening are all round in configuration, and said inner cup preventing means is a bead portion of a larger diameter than the diameter of said through opening.

16. The combination of claim 11, said attachment means between said cups comprising mating screw threads formed on said inner and outer cups for connecting and disconnecting said cups to each other.

17. The combination of claim 11, wherein said wheel is a vehicle wheel and said outer cup is a decorative cap for the hub of said wheel.

18. The combination of claim 17, where said preventing means of said outer cup comprises an outer skirt portion inclined at an angle to match said wheel hub, whereby a continuous finished surface appearance is created between said outer cup and said hub.

19. The combination of claim 11, wherein said inner and outer cups are each formed in one piece entirely of plastic.

20. The combination of claim 11, wherein said lever is hingedly joined to said inner cup end wall intermediate its ends, said lug being formed at one end of said hinge portion, and a push bar portion of said lever portion at the end thereof opposite said lug.

21. The combination of claim 11, said attachment means between said cups comprising mating threads formed as male threads on said inner cup and female threads on a depending flange formed on said outer cup concentrically inwardly of said cooperable portion of said outer cup.

22. The combination of claim 11, said outer cup comprising an end wall, said teeth being formed on the inside of said outer cup end wall, and said lug being formed on the end of said integral flexible lever which is formed in said end wall of said inner cup, said lever being hingedly joined to said inner cup end wall, whereby said lug may be lifted away from said teeth by pivoting said lever about said hinge portions to thereby disengage said lock means between said inner and outer cups.

23. A hub cap device for attachment to a wheel formed with a central hub having an inturned lip defining a through opening, the combination comprising an inner cup having a portion sized to fit through said wheel hub and said central through opening, means on said inner cup cooperable with the inside of said inturned lip to prevent passage of said inner cup completely through said through opening, an outer cup having a portion cooperable with the outside of said wheel hub and to prevent said outer cup from passing through said through opening, attachment means between said inner and outer cups securing said inner and outer cups together when assembled, lock means between said cups to prevent inadvertent disassembly of said cups comprising an integral flexible lever having a lug at one end of one of said cups and an annular ring of radially disposed teeth on the other of said cups which define locking slots therebetween cooperable with said lug wherein said integral flexible lever is formed in the inner end wall of said inner cup, and wherein said lever is hingedly joined to said end wall intermediate its ends, said lug being formed at one end of said hinge portion, and a push bar portion of said lever portion at the end thereof opposite said lug.

24. A hub cap device for attachment to a wheel formed with a central hub having an inturned lip defining a through opening, the combination comprising an inner cup having a portion sized to fit through said wheel hub and said central through opening, means on said inner cup cooperable with the inside of said inturned lip tp prevent passage of said inner cup completely through said through opening, an outer cup having a portion cooperable with the outside of said wheel hub and to prevent said outer cup from passing through said through opening, attachment means between said inner and outer cups securing said inner and outer cups together when assembled lock means between said cups to prevent inadvertent disassembly of said cups comprising an integral flexible lever having a lug at one end on one of said cups and an annular ring of radially disposed teeth on the other of said cups which define locking slots therebetween cooperable with said lug said outer cup comprising an end wall, said slots being formed on the inside of said outer cup end wall, said lug being formed on the end of said integral flexible lever which is formed in said end wall of said inner cup, and said lever being hingedly joined to said inner cup end wall, whereby said lug may be lifted out of one of said slots by pivoting said lever about said hinge portions to thereby disengage said lock means between said inner and outer cups.

* * * * *